(12) United States Patent
Liu et al.

(10) Patent No.: US 9,075,209 B2
(45) Date of Patent: Jul. 7, 2015

(54) OPTICAL MODULE HAVING ADDITIONAL LENS FOR DIFFERENT CONNECTION

(71) Applicant: HON HAI PRECISION INDUSTRY CO., LTD., New Taipei (TW)

(72) Inventors: Jia-Hau Liu, New Taipei (TW); Yuan-Chieh Lin, Lake Forest, CA (US)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 13/919,148

(22) Filed: Jun. 17, 2013

(65) Prior Publication Data

US 2014/0369650 A1    Dec. 18, 2014

(51) Int. Cl.
   *G02B 6/36* (2006.01)
   *G02B 6/42* (2006.01)

(52) U.S. Cl.
   CPC ............ *G02B 6/4295* (2013.01); *G02B 6/4204* (2013.01); *G02B 6/4214* (2013.01); *G02B 6/425* (2013.01)

(58) Field of Classification Search
   USPC .......................................................... 385/79
   See application file for complete search history.

(56) References Cited

U.S. PATENT DOCUMENTS

| | | | |
|---|---|---|---|
| 6,393,184 B1 * | 5/2002 | Day et al. ........................ | 385/49 |
| 7,418,165 B2 | 8/2008 | Glebov et al. | |
| 7,680,367 B2 | 3/2010 | Matsuoka et al. | |
| 2012/0141070 A1 | 6/2012 | Sabo | |
| 2012/0308188 A1 | 12/2012 | Chien et al. | |
| 2014/0050442 A1 * | 2/2014 | Wurster et al. .................. | 385/50 |

* cited by examiner

*Primary Examiner* — Jerry Blevins
(74) *Attorney, Agent, or Firm* — Ming Chieh Chang; Wei Te Chung (57) ABSTRACT

An optical module (30) includes an optical waveguide (31), a first ferrule and a second ferrule (32, 33) connected with the optical waveguide. The optical waveguide includes 2N optical channels (313). The first and the second ferrules includes N mirrors (34, 36) and N+1 lenses (35, 37). N of the 2N optical channels optically couple the N mirrors (34) of the first ferrule with N of the N+1 lenses (37) of the second ferrule, and the remaining N of the 2N optical channel couple N of the N+1 lenses (35) of the first ferrule with the N mirrors (36) of the second ferrule.

17 Claims, 8 Drawing Sheets

FIG. 8

US 9,075,209 B2

OPTICAL MODULE HAVING ADDITIONAL LENS FOR DIFFERENT CONNECTION

CROSS REFERENCE TO RELATED APPLICATION

This application relates to a copending patent application Ser. No. 13/595,113 filed Aug. 27, 2012 and titled "OPTICAL MODULE FOR TRANSMITTING OPTICAL SIGNAL."

BACKGROUND OF THE INVENTION

1. Field of the Invention

The present invention relates to an optical module, and more particularly to an optical module for optical communication application.

2. Description of Related Arts

Figure 1:
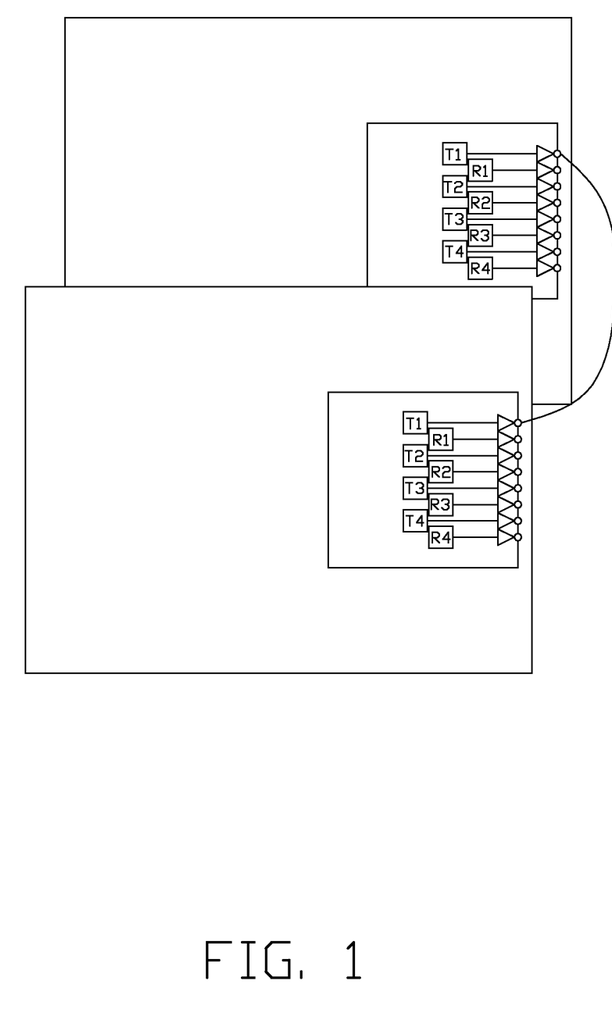
FIG. 1 is a sketch view of a switch card and a line card of a prior art backplane assembly.

Referring to FIG. 1, an optical backplane system comprises a backplane, a plurality of switch cards mounted to the backplane, and a plurality of line cards mounted to the backplane. The switch cards and line cards are inserted into the backplane system along a same direction. The lines cards are connected with the switch cards using optical modules. Each of the line cards and the switch cards comprises a plurality of transmitters T1-T4 of same arrangement and a plurality of receivers R1-R4 of same arrangement. It is needed to design a transmitter at an end of the optical medium and a receiver in the other end of the optical medium. If all of the switch cards and the line card have a plurality of transmitters and receivers with a same arrangement, a straightforward coupling would result in the transmitters of the switch cards coupling to the transmitters of the line cards and the receivers of the switch cards coupling to the receivers of the line cards, which is impracticable.

U.S. Patent Application Publication No. 2012/0308188, published on Dec. 6, 2012, to Chien et al. discloses a similar optical backplane system. The optical backplane system comprises a backplane, a pair of switch cards mounted to the backplane, a plurality of line cards mounted to the backplane and disposed parallel to the switch cards. All of the switch and the line cards comprise a plurality of optical connecting portions. The optical backplane assembly further comprises an optical connecting member to couple the optical connecting portions of the line cards with the optical connecting portions of the switch cards. U.S. Pub. No. 2012/0141070, published on Jun. 7, 2006, discloses an optical connector assembly used for connecting cards of a backplane system. U.S. Pat. No. 7,418,165, issued on Aug. 26, 2008, to Glebov et al., and U.S. Pat. No. 7,680,367, issued on Mar. 16, 2010, to Matsuoka et al. disclose optical signal transmission in optical medium. An improved optical module is desired to offer advantages over the related art.

SUMMARY OF THE INVENTION

An object of the present invention is to provide an optical module with the two ends could be assembled to different types to mate with different ports.

To achieve the above-mentioned object, an optical module comprises:

an optical waveguide having a first end and a second end opposite to the first end, the optical waveguide comprising 2N optical channels extending between the first end and the second end;

a first ferrule connected with the first end of the optical waveguide, the first ferrule comprising N first mirrors arranged in one row, and N+1 first lenses arranged in another row, the first lenses disposed spaced apart from the first mirrors; and a second ferrule connected with the second end of the optical waveguide, the second ferrule comprising N second mirrors arranged in one row, and N+1 second lenses arranged in another row, the second lenses disposed spaced apart from the second mirrors;

wherein N of the 2N optical channels optically couple the N first mirrors with N of the N+1 second lenses, and the remaining N of the 2N optical channels couple N of the N+1 first lenses with the N second mirrors.

According to the present invention, the waveguide could be adjusted to establish connections between the first lenses and the second mirrors or the first mirrors and the second lenses.

DETAILED DESCRIPTION OF THE PREFERRED EMBODIMENT

Reference will now be made in detail to a preferred embodiment of the present invention.

Figure 2:
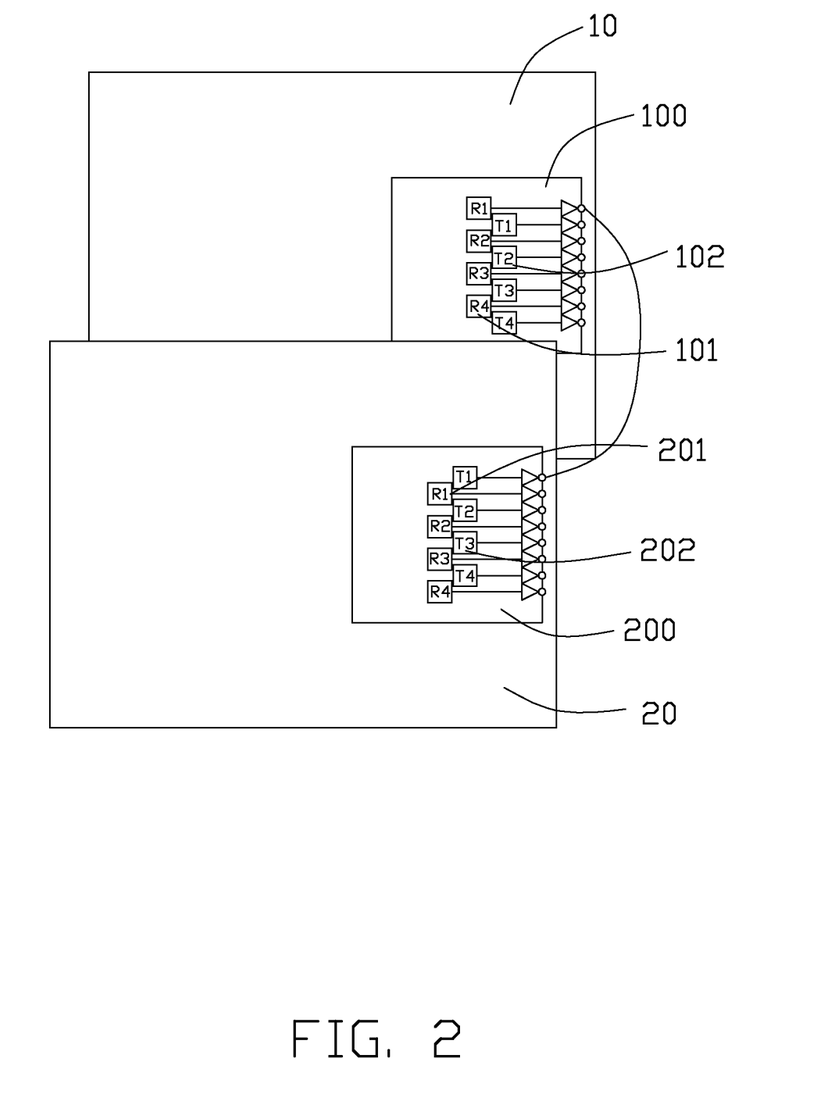
FIG. 2 is a sketch view of a switch card and a line card in accordance with the present invention.
Figure 3:
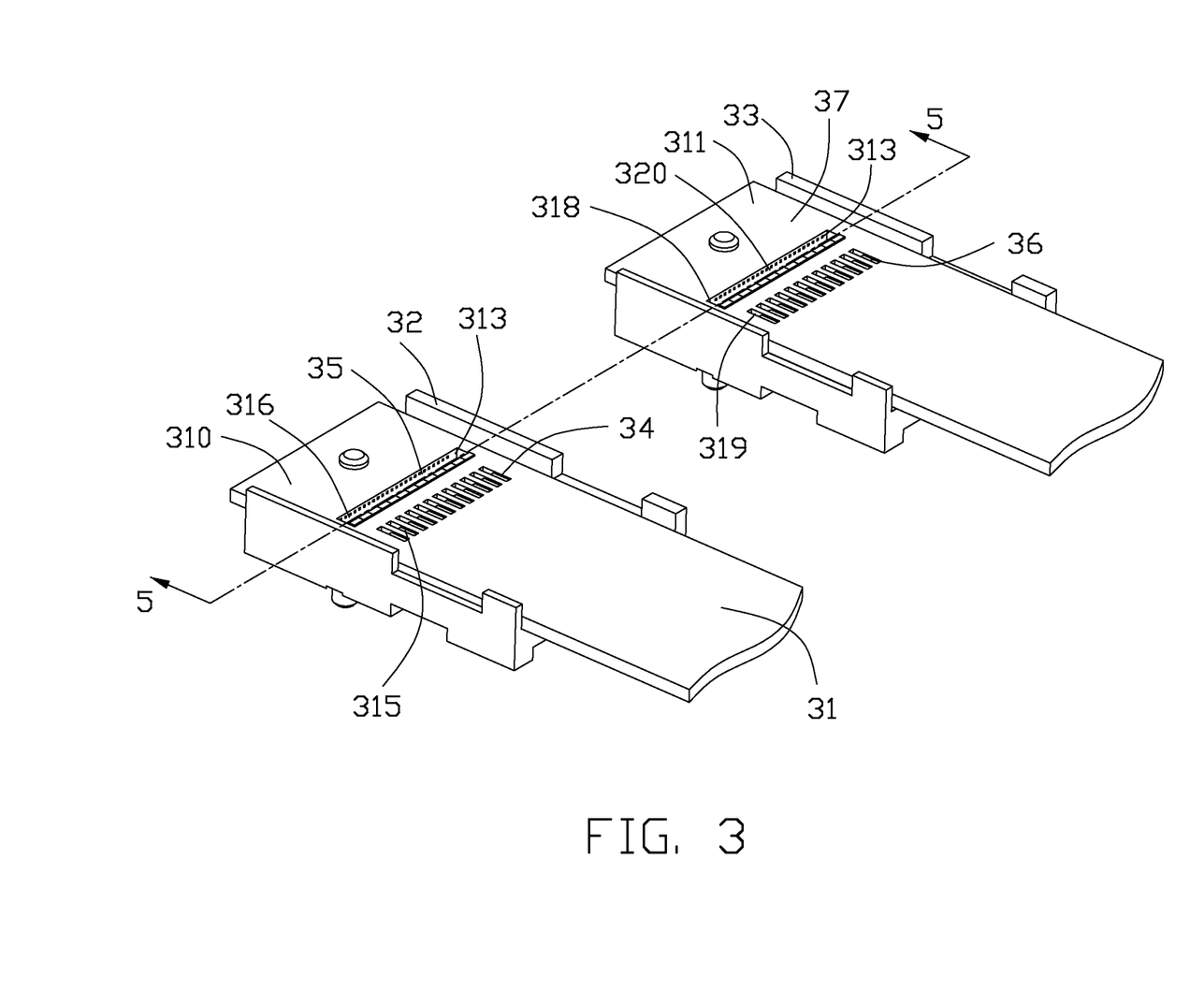
FIG. 3 is a perspective view of an optical module in accordance with the present invention.
Figure 4:
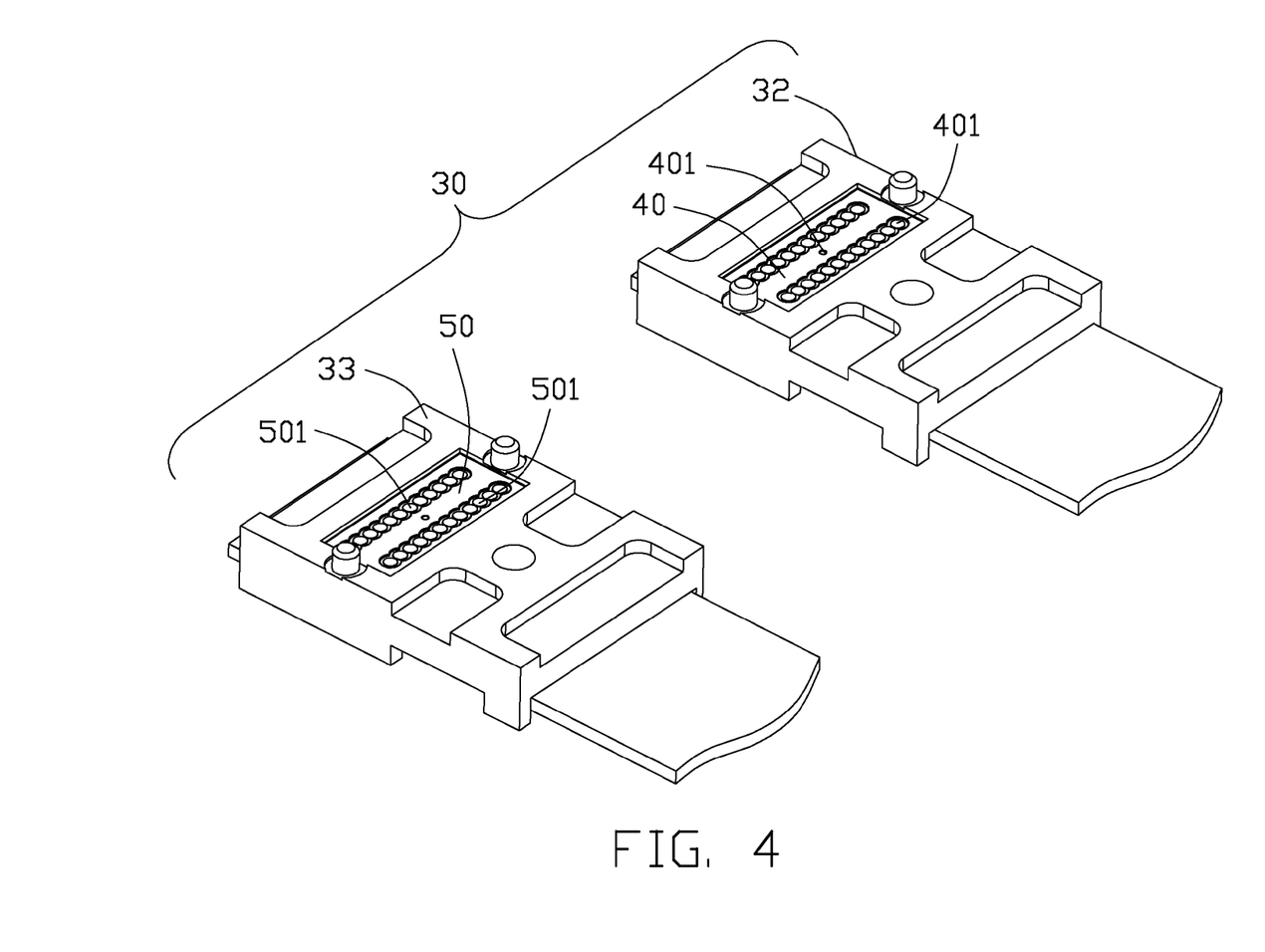
FIG. 4 is another perspective view of the optical module as shown in FIG. 3.

Referring to FIG. 2, an backplane assembly 1 comprises a backplane (Not shown), a plurality of switch cards 10 (Only one is shown) mounted to the backplane, a plurality of line cards 20 (Only one is shown) mounted to the backplane, and a plurality of optical modules 30 optically coupling with the switch cards 10 and line cards 20. The switch cards 10 and the line cards 20 are arranged side by side. The switch card 10 comprises an OE module 100 comprising a plurality of receivers 101, such as photodiodes, arranged in a row, and a plurality of transmitters 102, such as VCSELs, arranged in another row. Each of the receivers 101 are upwardly moved a half pitch with corresponding one transmitter 102. The line card 20 comprises an OE module 200 comprising a plurality of receivers 201, such as photodiodes, arranged in a row, and a plurality of transmitters 202, such as VCSELs, arranged in another row. Each of the receivers 201 are downwardly moved a half pitch with corresponding one transmitter 202.

Referring to FIGS. 3 to 6, the optical module 30 comprises a optical waveguide 31 having a first end 310 and a second end 311 opposite to the first end 310, a first ferrule 32 connected with the first end 310 of the optical waveguide 31, and a second ferrule 33 connected with the second end 311 of the optical waveguide 31. The optical waveguide 31 is made from polymer material. The optical waveguide 31 comprises 2N optical channels 313 extending between the first end 310 and the second end 311. The optical channels 313 are arranged in a row. Each of the channels 313 is spaced apart a pitch from adjacent one. The first end 310 of the optical waveguide 31 defines a first through hole 314, a plurality of first holes 315 arranged in a first row and spaced apart a pitch from adjacent one, and a first slot 316 disposed between the first through hole 314 and the first holes 315. The first slot 316 extends along a direction parallel to the first row. The second end 311 of the optical waveguide 31 defines a second through hole 317, and a plurality of second holes 318 arranged in a second row and spaced apart the pitch from adjacent one, and a second slot 319 disposed between the second through hole 317 and the second holes 318. The second slot 319 extends along a direction parallel to the second row.

Referring to FIGS. 3 to 8, the first ferrule 32 comprises a first bottom wall 320, and a pair of first side walls 321 respectively projecting upwardly from sides of the first bottom wall 320, and a first receiving space 322 formed by the first bottom wall 320 and the first side walls 321. The first bottom wall 320 comprises a first post 323 projected into the first receiving space 322, and a pair of first mounting post 324 for being mounted to an outer device. The first bottom wall 320 defines a first receiving hole 325 extending therethrough. The second ferrule 33 comprises a second bottom wall 330, and a pair of second side walls 331 respectively projecting upwardly from sides of the second bottom wall 330, and a second receiving space 332 formed by the second bottom wall 330 and second receiving space 331. The second bottom wall 330 comprises a second post 333 projected into the second receiving space 332, and a pair of second mounting post 334 for being mounted to an outer device. The second bottom wall 330 defines a second receiving hole 335 extending therethrough.

The first ferrule 32 comprises N first mirrors 34 arranged in a row, and N+1 first lenses 35 arranged in another row, the first lenses 35 disposed spaced apart from the first mirrors 34. The first lenses 35 are arranged side by side, and the first mirrors 34 are arranged spaced apart from each other. Each of the first lenses 35 is offset with corresponding one first mirror 34. The first lenses 35 and the first mirrors 34 are disposed on the first bottom wall 320. The first lenses 35 are disposed closer to the first post 323 than the first mirrors 34. The N first mirrors 34 are received in the first holes 315, respectively, with each first mirrors 34 optically coupling with corresponding one of the optical channels 313. The N of the N+1 first lenses 35 are received in the first slot 316, with each of the N first lenses 35 optically coupling with corresponding one of the remaining optical channels 313. Therefore, one of the N+1 first lenses 35 is unused.

Figure 5:
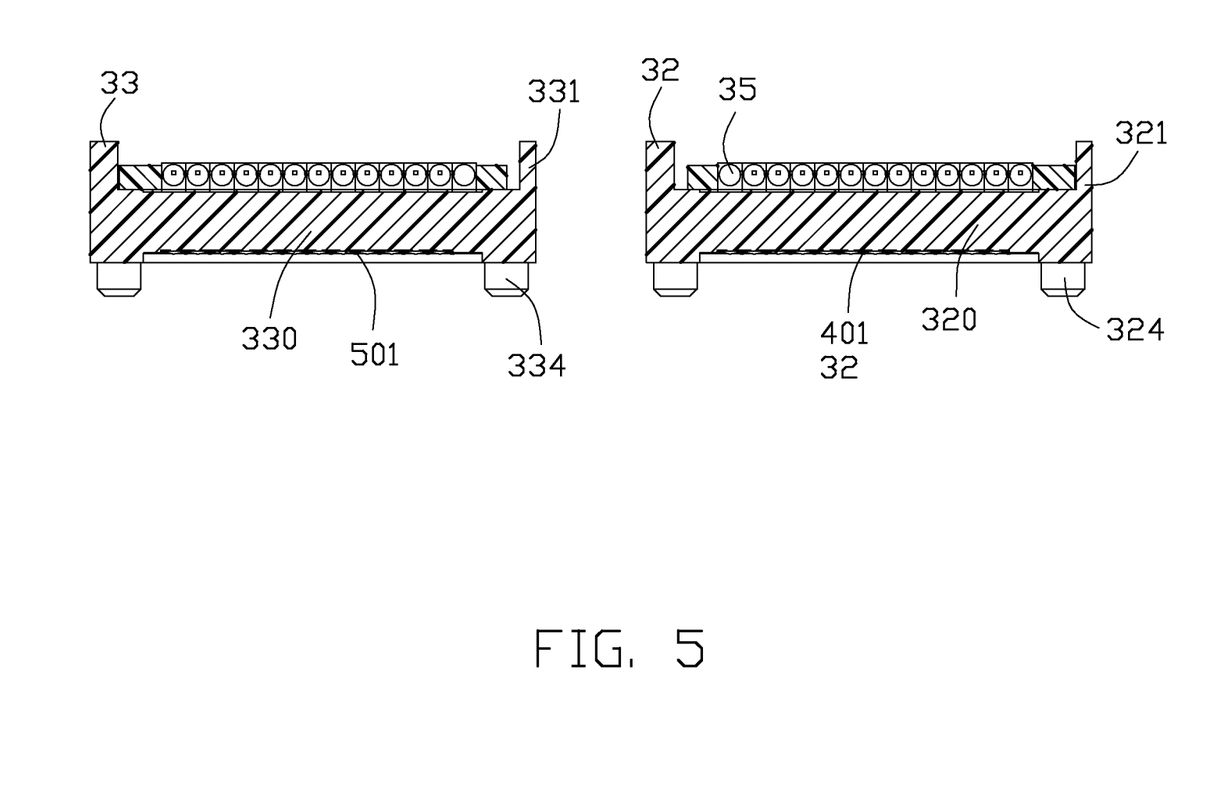
FIG. 5 is a cross-sectional view of the optical module taken along line 5-5 of FIG. 3.
Figure 6:
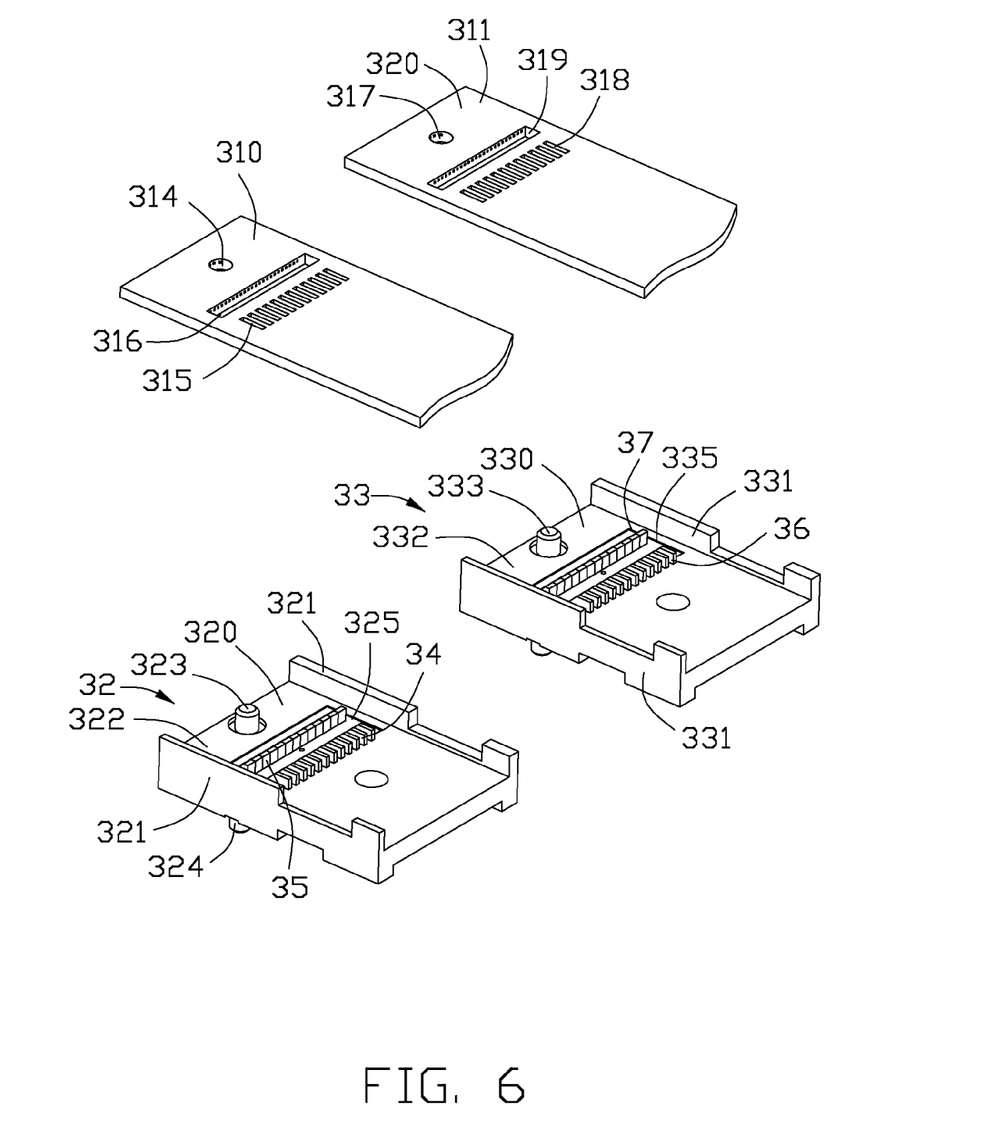
FIG. 6 is an exploded view of the optical module as shown in FIG. 3.
Figure 7:
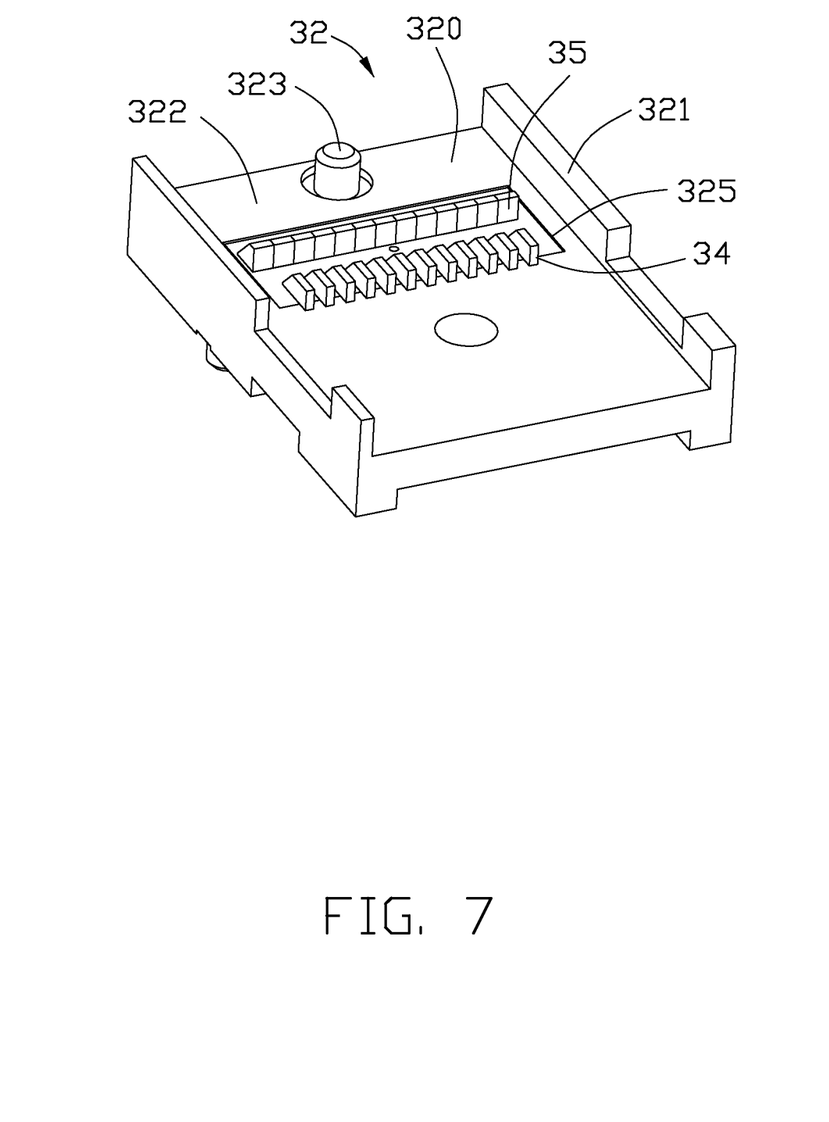
FIG. 7 is a perspective view of the first or the second ferrule of the optical module as shown in FIG. 3.
Figure 8:
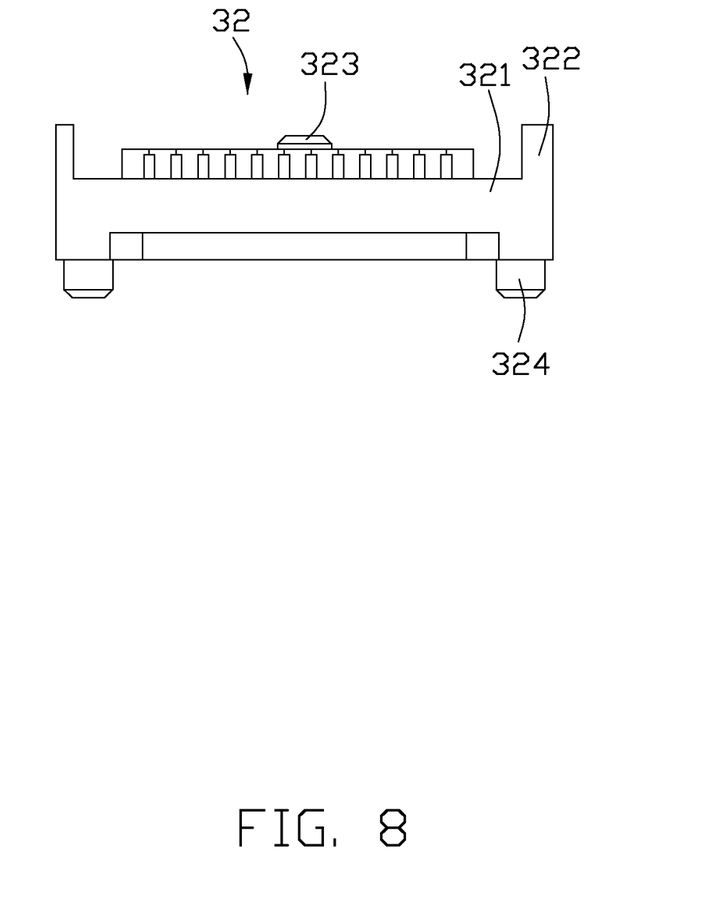
FIG. 8 is a back side view of the first or the second ferrule of the optical module as shown in FIG. 7.

The second ferrule 33 comprises N second mirrors 36 arranged in a row, and N+1 second lenses 37 arranged in another row, the second lenses 37 disposed spaced apart from the second mirrors 36. The second lenses 37 are arranged side by side, and the second mirrors 36 are arranged spaced apart with each other. Each of the second lenses 37 is offset with corresponding one second mirror 36. The second lenses 37 and the second mirrors 36 are disposed on the second bottom wall 330. The second lenses 37 are disposed closer to the second post 333 than the second mirrors 36. The N second mirrors 36 are received in the second holes 318, respectively, with each second mirrors 36 optically coupling with corresponding one of the N of the 2N optical channels 313. The N of the N+1 second lenses 37 are received in the second slot 319, with each of the N second lens 37 optically coupling with corresponding one of the remaining N of the N+1 optical channels 313. Therefore, one of the N+1 second lenses 37 is unused. As shown in FIG. 5, in this embodiment, the unused first lens 35 is disposed at the outmost side adjacent to the second ferrule 33, and the unused second lens 37 is disposed at the outmost side adjacent to the first ferrule 33, when the first and the second ferrule 32, 33 are dispose side by side at a same plane. In other word, the unused first lenses 35 is disposed at a side of the first ferrule 32, and the unused second lenses 37 is disposed at an opposite side of the second ferrule 33, when the first ferrule and the second ferrule 32, 33 are disposed side by side in a same plane.

Referring to FIGS. 3 to 6, the optical module comprises a first lens array 40 received in the first receiving hole 325 of the first ferrules 32, and a second lens array 50 received in the second hole 335 of the second ferrule 33. The first lens array 40 comprises 2N first optical lenses 401 arranged with two rows, both rows having N first optical lenses 401. The second lens array 50 comprises 2N second optical lenses 501 arranged with two rows, both rows having N second optical lenses 501. The first post 323 mats with a first through hole 314 to accurately position the optical waveguide 31 to the first ferrule 32. Therefore, one row of the first optical lenses 401 are optically coupling with the first lenses 35, respectively, and the other row of the first optical lenses 401 are optically coupling with the first mirrors 34, respectively. The second post 333 mats with the second through hole 317 to accurately position the optical waveguide 31 to the second ferrule 3. Therefore, one row of the second optical lenses 501 are optically coupling with the N of the N+1 second lenses 37, respectively, and the other row of the second optical lenses 502 are optically coupling with the second mirrors 36. N of the 2N channels 313 are optically coupling the N of the N+1 first lenses 35 with the N second mirrors 36, and the remaining N of the 2N channels 313 are optically coupling the N first mirrors 34 with the N of the N+1 second lenses 37. The N of the 2N optical channels 313 are alternately arranged with the remaining N of the 2N optical channels 313, respectively. As the receivers 101 of the line card 20 are upwardly moved a half pitch, and the receivers 201 of the switch card 10 are downwardly moved a half pitch. Therefore, the receiver 101 of the line card 20 and the transmitter 202 of the switch card 10 are optically connected by the optical module 30, when the line card 20 and the switch card 10 are inserted into the backplane along a same direction.

It is to be understood, however, that even though numerous characteristics and advanarmes of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical module comprising:
   an optical waveguide having a first end and a second end opposite to the first end, the optical waveguide comprising 2N optical channels extending between the first end and the second end;
   a first ferrule connected with the first end of the optical waveguide, the first ferrule comprising N first mirrors arranged in one row, and N+1 first lenses arranged in another row, the first lenses disposed spaced apart from the first mirrors; and
   a second ferrule connected with the second end of the optical waveguide, the second ferrule comprising N second mirrors arranged in one row, and N+1 second lenses arranged in another row, the second lenses disposed spaced apart from the second mirrors;
   wherein N of the 2N optical channels optically couple the N first mirrors with N of the N+1 second lenses, with the remaining one of the N+1 second lenses unused, and the remaining N of the 2N optical channels couple N of the N+1 first lenses with the N second mirrors, with the remaining one of the N+1 first lenses unused.

2. The optical module as recited in claim 1, wherein the N of the 2N optical channels are alternately arranged with the remaining N of the 2N optical channels, respectively.

3. The optical module as recited in claim 2, wherein the first ferrule comprises a first flat bottom wall and a pair of opposite first side walls extending upwardly from the first bottom wall, a first receiving space formed by the first bottom wall and the first side walls, the first end of the optical waveguide received in the first receiving space.

4. The optical module as recited in claim 3, wherein the first lenses are arranged side by side, and the first mirrors are arranged spaced apart from each other.

5. The optical module as recited in claim 4, wherein each of the first lenses is offset with corresponding one first mirror.

6. The optical module as recited in claim 5, wherein the first lenses and the first mirrors are disposed on the first bottom wall.

7. The optical module as recited in claim 6, wherein the first end of the waveguide defines a slot for receiving the first lenses, and a plurality of holes for receiving the first mirrors respectively.

8. The optical module as recited in claim 7, further comprising a lens array received in the first bottom wall, the lens array comprising two rows of optical lenses optically connecting with the first lenses and the first mirrors, respectively.

9. The optical module as recited in claim 8, wherein the first ferrule comprises a post disposed on the first bottom wall and projected into the first receiving space, and the first end of the waveguide defines a through hole for mating with the post.

10. The optical module as recited in claim 9, wherein the first ferrule comprises a pair of mounting posts disposed on the bottom wall for mounting to an outer device.

11. The optical module as recited in claim 1, wherein the unused first lens is disposed at a side of the first ferrule, and the unused second lens is disposed at an opposite side of the second ferrule, when the first ferrule and the second ferrule are disposed side by side in a same plane.

12. An optical module comprising:
a ferrule including a first row of mirrors densely arranged with one another along a transverse direction with a pitch; and
a second row of lenses densely arranged with one another along said transverse direction with said pitch; wherein an amount of said mirrors is less than that of the lenses by only one, and said mirrors are not respectively aligned with said lenses along a front-to-back direction perpendicular to said transverse direction but at an offset with one half of said pitch;
further comprising another identical optical module with an optical waveguide connected therebetween, wherein said optical waveguide includes a plurality of optical channels, an amount of said optical channels being equal to twice of the amount of said mirrors, the optical channels optically coupling with the mirrors and the lenses, respectively, with one lens unused on each of said optical modules.

13. An optical module comprising:
an optical waveguide having a first end and a second end opposite to the first end, the optical waveguide comprising 2N optical channels extending between the first end and the second end;
a first ferrule connected with the first end of the optical waveguide, the first ferrule comprising N first mirrors arranged in one row, and N+1 first lenses arranged in another row, the first lenses disposed spaced apart from the first mirrors; and
a second ferrule connected with the second end of the optical waveguide, the second ferrule comprising N second mirrors arranged in one row, and N+1 second lenses arranged in another row, the second lenses disposed spaced apart from the second mirrors;
wherein N of the 2N optical channels optically couple the N first mirrors with N of the N+1 second lenses, and the remaining N of the 2N optical channels couple N of the N+1 first lenses with the N second mirrors;
wherein the N of the 2N optical channels are alternately arranged with the remaining N of the 2N optical channels, respectively;
wherein the first ferrule comprises a first flat bottom wall and a pair of opposite first side walls extending upwardly from the first bottom wall, a first receiving space formed by the first bottom wall and the first side walls, the first end of the optical waveguide received in the first receiving space;
wherein the first lenses are arranged side by side, and the first mirrors are arranged spaced apart from each other;
wherein each of the first lenses is offset with corresponding one first mirror;
wherein the first lenses and the first mirrors are disposed on the first bottom wall;
wherein the first end of the waveguide defines a slot for receiving the first lenses, and a plurality of holes for receiving the first mirrors respectively.

14. The optical module as recited in claim 13, further comprising a lens array received in the first bottom wall, the lens array comprising two rows of optical lenses and optically connecting with the first lenses and the first mirrors respectively.

15. The optical module as recited in claim 14, wherein the first ferrule comprises a post disposed on the first bottom wall and projected into the first receiving space, and the first end of the waveguide defines a through hole for mating with the post.

16. The optical module as recited in claim 15, wherein the first ferrule comprises a pair of mounting posts disposed on the bottom wall for mounting to an outer device.

17. The optical module as recited in claim 13, wherein the unused first lens is disposed at a side of the first ferrule, and the unused second lens is disposed at an opposite side of the second ferrule, when the first ferrule and the second ferrule are disposed side by side in a same plane.

* * * * *